(12) United States Patent
Mukai

(10) Patent No.: US 11,854,169 B2
(45) Date of Patent: Dec. 26, 2023

(54) IMAGE CORRECTION DEVICE, IMAGE GENERATION DEVICE, CAMERA SYSTEM, AND VEHICLE

(71) Applicant: Panasonic Intellectual Property Management Co., Ltd., Osaka (JP)

(72) Inventor: Toshiro Mukai, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 350 days.

(21) Appl. No.: 17/407,970

(22) Filed: Aug. 20, 2021

(65) Prior Publication Data

US 2021/0383513 A1 Dec. 9, 2021

Related U.S. Application Data

(63) Continuation of application No. PCT/JP2019/047859, filed on Dec. 6, 2019.

(30) Foreign Application Priority Data

Mar. 1, 2019 (JP) .................. 2019-037917

(51) Int. Cl.
G06T 5/00 (2006.01)
H04N 23/55 (2023.01)
B60R 1/27 (2022.01)

(52) U.S. Cl.
CPC ............... *G06T 5/006* (2013.01); *B60R 1/27* (2022.01); *H04N 23/55* (2023.01); *B60R 2300/105* (2013.01)

(58) Field of Classification Search
None
See application file for complete search history.

(56) References Cited

U.S. PATENT DOCUMENTS

| 2004/0036844 | A1* | 2/2004 | Wood ................... G03B 21/005 353/70 |
| 2016/0060824 | A1* | 3/2016 | Akashi .................. G06T 3/4038 348/148 |
| 2022/0148138 | A1* | 5/2022 | Nakayama ............. G03B 15/00 |

FOREIGN PATENT DOCUMENTS

| JP | 2011-049733 | 3/2011 |
| JP | 4862321 | 1/2012 |

OTHER PUBLICATIONS

English translation of Notification of Second Office Action in related Chinese Patent Application No. 201980093239.9, dated Jun. 29, 2023.

(Continued)

*Primary Examiner* — Delomia L Gilliard
(74) *Attorney, Agent, or Firm* — GREENBLUM & BERNSTEIN, P.L.C.

(57) ABSTRACT

An image correction device including: an image data acquisition part for acquiring the image data obtained by a camera; and a correction part for correcting the image data on the basis of a first difference that is a difference between a first image height obtained by light having entered the camera at a first incident angle and a first reference image height obtained by light having entered the camera at the first incident angle when the camera is free of manufacturing errors.

11 Claims, 10 Drawing Sheets

(56) References Cited

OTHER PUBLICATIONS

English translation of Notification of First Office Action in related Chinese Patent Application No. 201980093239.9, dated Dec. 2, 2022.
International Search Report issued in International Pat. Appl. No. PCT/JP2019/047859, dated Jan. 28, 2020, along with an English translation thereof.

* cited by examiner

FIG. 11

| INCIDENT ANGLE α (°) | AZIMUTH ANGLE θ (°) ON SENSOR ||||||||
|---|---|---|---|---|---|---|---|---|
| | 0° | 45° | 90° | 135° | 180° | 225° | 270° | 315° |
| 0° | -3.2 | -2.4 | -0.9 | -1.1 | 0 | 0 | +0.5 | -2.6 |
| ... | ... | ... | ... | ... | ... | ... | ... | ... |
| 60° | -5 | -3.5 | -1 | 0 | +1 | -0.5 | -2.5 | -4 |
| 70° | ... | ... | ... | ... | ... | ... | ... | ... |
| ... | ... | ... | ... | ... | ... | ... | ... | ... |
| 100° | ... | ... | ... | ... | ... | ... | ... | ... |

IMAGE CORRECTION DEVICE, IMAGE GENERATION DEVICE, CAMERA SYSTEM, AND VEHICLE

CROSS-REFERENCE TO RELATED APPLICATIONS

This application is a Bypass Continuation of International Application No. PCT/JP2019/047859 filed Dec. 6, 2019, claiming priority to Japanese Patent Application No. 2019-037917 filed Mar. 1, 2019, the contents of both applications are incorporated herein by reference in their entirety.

TECHNICAL FIELD

The present disclosure relates to an image correction apparatus, an image generation apparatus, a camera system, and a vehicle.

RELATED ART

In recent years, a vehicle in which an image appearing as if the vehicle is looked down from above is displayed on a monitor in the interior of the vehicle (hereinafter, the image will be referred to as "bird's-eye view") has been becoming popular. This vehicle includes a plurality of cameras installed on the front, rear, left, and right of the vehicle, and an image generation apparatus. These cameras include each a lens having a wide angle of view, such as a fisheye lens, and make it possible to obtain images having distortion. The image generation apparatus generates a bird's-eye view by eliminating distortion of images obtained from each camera and combining the images from which the distortion has been eliminated.

Patent Literature (hereinafter, referred to as "PTL") 1 discloses that distortion of an image obtained by a camera is eliminated by assigning a different function model in each region of the image and correcting the image based on the assigned function models.

CITATION LIST

Patent Literature

PTL 1
Japanese Patent Application Laid-Open No. 2011-49733

SUMMARY

An image correction apparatus according to the present disclosure includes: an image data acquirer that acquires image data obtained by a camera; and a corrector that corrects the image data based on a first difference that is a difference between a first image height obtained by light having entered the camera at a first incident angle and a first reference image height obtained by light having entered the camera at the first incident angle in a case where the camera is free of manufacturing error.

An image generation apparatus according to the present disclosure includes: an image data acquirer that acquires image data obtained by a camera; a corrector that corrects the image data based on a first difference that is a difference between a first image height obtained by light having entered the camera at a first incident angle and a first reference image height obtained by light having entered the camera at the first incident angle in a case where the camera is free of manufacturing error; a distortion eliminator that eliminates distortion from a corrected image that is an image generated from the image data corrected by the corrector; and an image combiner that generates a combined image by combining a first distortion-eliminated image and a second distortion-eliminated image. The first distortion-eliminated image is generated by the distortion eliminator based on first image data obtained by a first camera that is one of a plurality of the cameras. The second distortion-eliminated image is generated by the distortion eliminator based on second image data obtained by a second camera that is another one of the plurality of cameras.

A camera system according to the present disclosure includes: the first camera; the second camera; and the image generation apparatus.

A vehicle according to the present disclosure includes the camera system.

Advantageous Effects of Disclosure

According to the present disclosure, it is possible to provide an image correction apparatus and an image generation apparatus that are capable of obtaining an image comparable to an image obtained in a case where a camera is free of manufacturing error, as well as a camera system and a vehicle that include the image generation apparatus.

BRIEF DESCRIPTION OF DRAWINGS

FIG. 11 illustrates difference tables stored in storages included in the camera system according to Embodiment 1 of the present disclosure;

DESCRIPTION OF EMBODIMENTS

Hereinafter, embodiments will be described with reference to the accompanying drawings.

Embodiment 1

Figure 1:
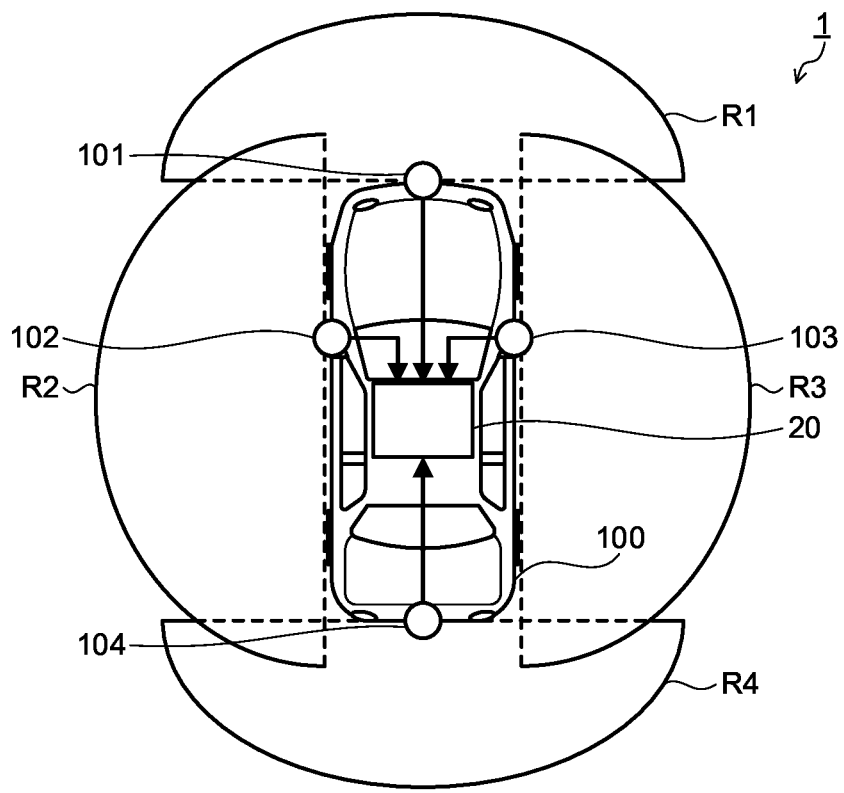
FIG. 1 is a schematic diagram illustrating a vehicle including a camera system according to Embodiment 1 of the present disclosure.

FIG. 1 is a schematic diagram illustrating vehicle 100 including camera system 1 according to Embodiment 1 of the present disclosure.

Camera system 1 includes four cameras 101, 102, 103, and 104, and electronic control unit (ECU) 20.

Cameras 101, 102, 103, and 104 are installed on the front, left, right, and rear sides of vehicle 100, respectively. Camera 101, 102, 103, and 104 image the front, left, right, and rear sides of vehicle 100, respectively, and image images of ranges corresponding to ranges R1, R2, R3, and R4, respectively. Cameras 101, 102, 103, and 104 include each a lens having a wide angle of view, such as a fisheye lens, for example. The number of cameras included in camera system 1 may be two or more.

ECU 20 acquires image data obtained by cameras 101, 102, 103, and 104, and generates a bird's-eye view based on the acquired image data.

First, generation of a bird's-eye view in a case where all cameras 101, 102, 103, and 104 are assumed to be free of manufacturing error will be described.

Figure 2:
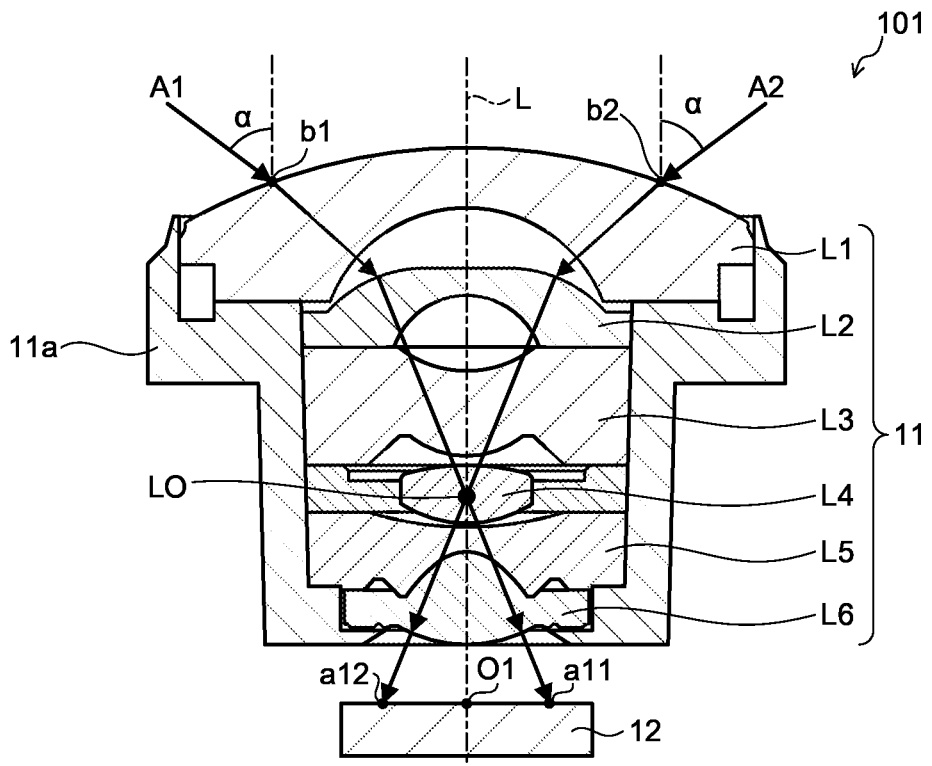
FIG. 2 is a longitudinal sectional view of a camera assumed to be free of manufacturing error.

FIG. 2 is a longitudinal sectional view of camera 101 assumed to be free of manufacturing error.

Camera 101 includes lens unit 11, lens barrel 11a, and sensor 12. Lens unit 11 includes a plurality of lenses L1, L2, L3, IA, L5, and L6. Lenses L1, L2, L3, IA, L5, and L6 are arranged in this order from an upstream side of an optical path toward a side on sensor 12, and are held in lens barrel 11a in a state in which mutual optical-axis alignment is performed. L indicates the optical axis of lens unit 11. Of lenses L1 to L6, lens L1 is on a side closest to a subject. Lenses L2 to L6 guide incident light on lens L1 to sensor 12. Sensor 12 detects light which has entered lens L1 and which has been guided by lenses L2 to L6.

For example, in a case where light A1 has entered lens unit 11 at incident angle α, an image is formed at a position indicated by point a11 on sensor 12. Further, in a case where light A2 has entered lens unit 11 at incident angle α from a position opposite to that of light A1, an image is formed at a position indicated by point a12 on sensor 12 by light A2. Point LO is a point at which incident light on lens unit 11 intersects optical axis L. Sensor 12 and optical axis L of lens unit 11 in a case where camera 101 is free of manufacturing error intersect each other at point O1. Point O1 indicates a position corresponding to an image center on sensor 12. The image center is a position that becomes a center of an image in a case where the image is outputted based on an image signal generated by sensor 12. Note that, a distance between the point (here, point O1) at which optical axis L of lens unit 11 and sensor 12 intersect each other and a position at which an image is formed on sensor 12 by incident light is referred to as "image height".

In practice, light enters from innumerable directions around optical axis L at one incident angle. Accordingly, there are also innumerable positions at which images are formed on sensor 12 by light having entered lens unit 11 at incident angle α, and a closed curve is drawn around optical axis L. Hereinafter, this closed curve is referred to as "image height curve". It goes without saying that the image height curve to be drawn varies depending on the value of incident angle α.

Figure 3:
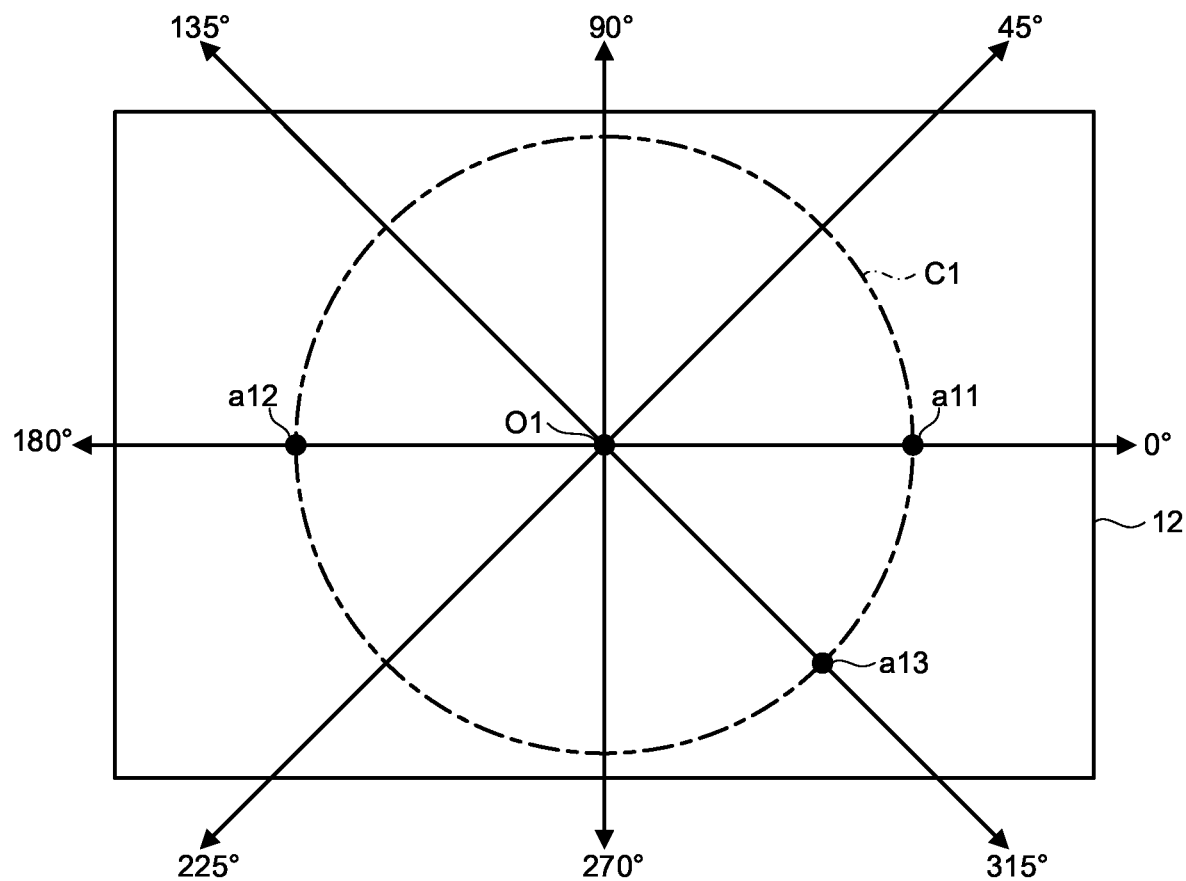
FIG. 3 illustrates an image height curve obtained in a case where light has entered the camera assumed to be free of manufacturing error at incident angle $\alpha$.

FIG. 3 illustrates image height curve C1 obtained in a case where light has entered camera 101 assumed to be free of manufacturing error at incident angle α. The angles illustrated in FIG. 3 indicate azimuth angles around point O1, and the azimuth angle at which point a11 on sensor 12 is located is defined as 0°. At this time, the optical path in lens unit 11 passes through lens unit 11 from a position (point b1), at which light A1 enters lens L1 at incident angle α, to point a11 on sensor 12 as illustrated in FIG. 2, and the position indicated by a11 on sensor 12 in FIG. 2 is denoted with a11 in FIG. 3. Point a12 is located in a direction of the azimuth angle of 180° when viewed from point O1. Even at this time, in the same manner as with a11, the optical path in lens unit 11 passes through lens unit 11 from a position (point b2), at which light A2 enters lens L1 at incident angle α, to point a12 on sensor 12 as illustrated in FIG. 2, and the position indicated by a12 on sensor 12 in FIG. 2 is denoted with a12 in FIG. 3. Point a13 indicates, although not illustrated in FIG. 2, a position on sensor 12, which light having entered lens unit 11 at incident angle α from a direction different from those of lights A1 and A2 reaches, and is located in a direction of the azimuth angle of 315° when viewed from point O1.

In a case where camera 101 is free of manufacturing error, a distance between point O1 and point a11, a distance between point O1 and point a12, and a distance between point O1 and point a13 are equal to each other. Image heights in directions of the azimuth angles of 45°, 90°, 135°, 225°, and 270° are also equal to image heights in directions of the azimuth angles of 0°, 180°, and 315°. That is, in a case where camera 101 is free of manufacturing error, the same image height is obtained when the incident angle is common regardless of the azimuth angle. Accordingly, image height curve C1 as illustrated in FIG. 3 has a circular shape.

Figure 4:
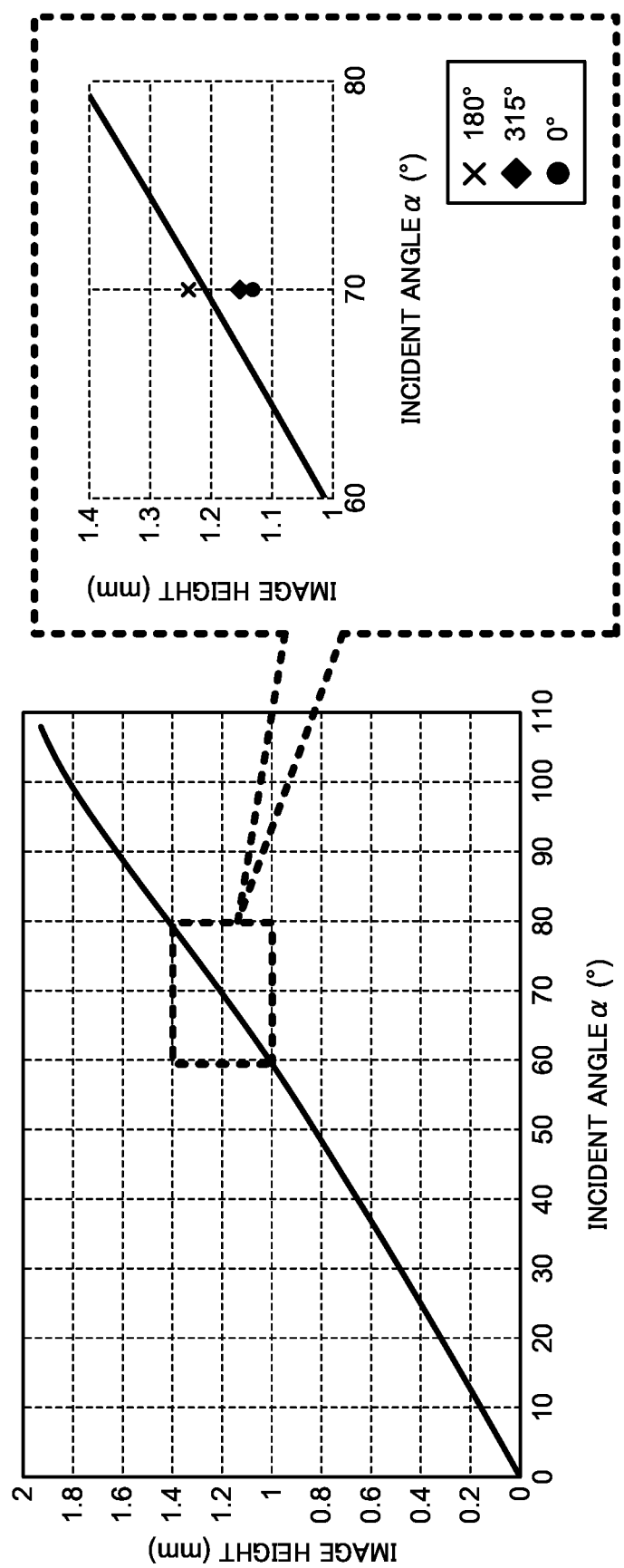
FIG. 4 illustrates a relationship between an image height obtained by light having entered the camera assumed to be free of manufacturing error and the incident angle.

FIG. 4 illustrates a relationship between an image height obtained by light having entered camera 101 assumed to be free of manufacturing error and the incident angle. As indicated by a curve in FIG. 4, the image height becomes larger as incident angle α becomes larger.

Characteristics of an image obtained in a case where camera 101 is free of manufacturing error have been described thus far. The same also applies to cameras 102, 103, and 104.

In a case where all cameras 101, 102, 103, and 104 are free of manufacturing error, an ideal bird's-eye view can be generated by eliminating distortion of images obtained from cameras 101, 102, 103, and 104 by a general method and combining the images from which the distortion has been eliminated.

Figure 5:
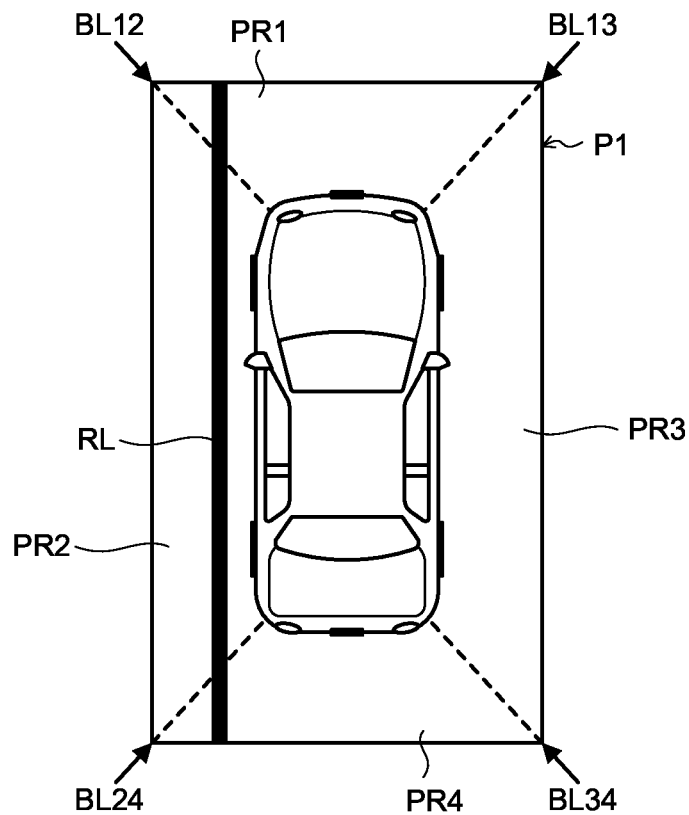
FIG. 5 illustrates an example of an ideal bird's-eye view.

FIG. 5 illustrates bird's-eye view (ideal combined image) P1 that is an example of the ideal bird's-eye view. PR1, PR2, PR3, and PR4 are image regions corresponding to images obtained by processing images obtained from cameras 101, 102, 103, and 104, respectively. BL12, BL24, BL34, and BL13 indicate a boundary line between image regions PR1 and PR2, a boundary line between image regions PR2 and PR4, a boundary line between image regions PR3 and PR4, and a boundary line between image regions PR1 and PR3, respectively. On bird's-eye view P1, roadside strip RL located across image regions PR1, PR2, and PR4 is indicated without deviating near boundary lines BL12 and BL24.

In practice, however, cameras 101, 102, 103, and/or 104 have/has a manufacturing error so that an ideal bird's-eye view as illustrated in FIG. 5 cannot be generated in a case where distortion of images obtained from cameras 101, 102, 103, and 104 is eliminated by a general method. Hereinafter, generation of an actual bird's-eye view will be described.

Figure 6:
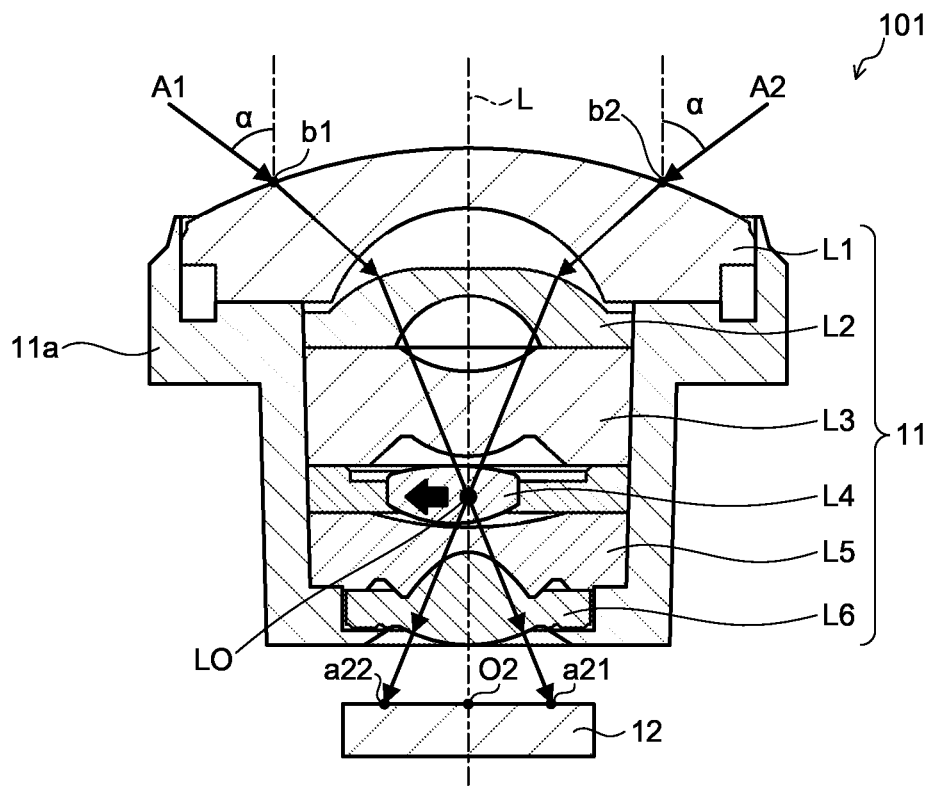
FIG. 6 is a longitudinal sectional view of the camera included in the camera system according to Embodiment 1 of the present disclosure.

FIG. 6 is a longitudinal sectional view of camera 101 included in camera system 1 according to Embodiment 1 of the present disclosure. FIG. 6 illustrates a case where lens L4 has a manufacturing error. Lens L4 of camera 101 illustrated in FIG. 6 is approximately eccentric in the horizontal direction. That is, lens L4 is disposed to deviate to the left side in comparison with the case where there is no manufacturing error as illustrated in FIG. 2.

Accordingly, in a case where camera 101 has a manufacturing error as illustrated in FIG. 6, optical axis L of lens unit 11 approximately deviates in the horizontal direction in comparison with the case where there is no manufacturing error as illustrated in FIG. 2. Thus, the intersection of optical axis L of lens unit 11 and sensor 12 becomes point O2 that is a position different from point O1 (see FIG. 2).

Further, when (1) the case where lens IA is free of manufacturing error is compared with (2) the case where only the position of lens L4 deviates as illustrated in FIG. 6, light enters lens L4 at different positions even when the light has entered lens L1 at the same position and at the same incident angle. Accordingly, paths of light guided to sensor 12 by lens unit 11 are different between the cases of (1) and (2).

For example, in a case where lights A1 and A2 have entered lens L1 at the positions illustrated in FIG. 6 and at incident angle α, images are formed at the positions indicated by points a21 and a22 on sensor 12 by lights A1 and A2, respectively. Point a21 is a position different from point a11 on sensor 12, and point a22 is a position different from point a12 on sensor 12. Note that, in a case where light with incident angle α, which is guided to point a13 (see FIG. 3) when lens L4 is free of manufacturing error, has entered camera 101 having a manufacturing error, the light is guided by lens unit 11 to a position different from the position indicated by point a13.

In a broken line frame of FIG. 4, an image height obtained by light having entered camera 101 at incident angle α=70° is exemplified. The circle in FIG. 4 indicates an image height at the azimuth angle of 0° obtained by the light with the incident angle of 70°, the cross in FIG. 4 indicates an image height at the azimuth angle of 180° obtained by the light with the incident angle of 70°, and the diamond in FIG. 4 indicates an image height at the azimuth angle of 315° obtained by the light with the incident angle of 70°, respectively.

In a case where camera 101 is free of manufacturing error, it can be gathered from the graph that the image heights obtained by the light with the incident angle of 70° are approximately 1.21 mm regardless of the azimuth angles. In camera 101 in practice, however, image heights at the azimuth angles of 0°, 180°, and 315° obtained by the light with the incident angle of 70° deviate from the image heights obtained in a case where camera 101 is free of manufacturing error. Further, the image heights at the azimuth angles of 0°, 180°, and 315° in a case where camera 101 is free of manufacturing error have different values from each other.

In practice, lights entering lens unit 11 are innumerable. These lights are guided onto sensor 12 in different paths in comparison with a case where there is no manufacturing error. That is, positions at which images are formed on sensor 12 by any light entering lens unit 11 may deviate in comparison with those in a case where camera 101 is free of manufacturing error.

Figure 7:
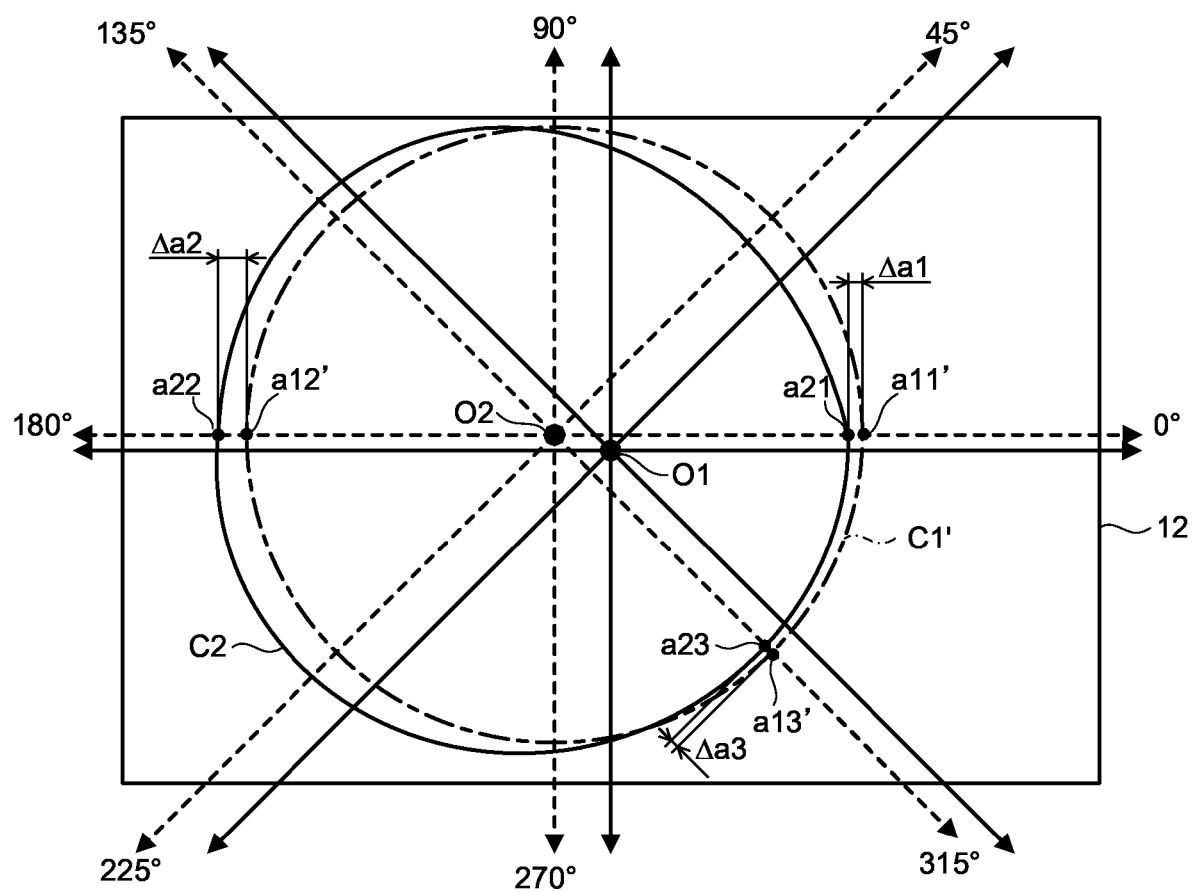
FIG. 7 illustrates an image height curve obtained in a case where light has entered the camera of Embodiment 1 of the present disclosure at incident angle $\alpha$.

FIG. 7 illustrates an example of an image height curve obtained by camera 101 having a manufacturing error. FIG. 7 illustrates image height curve C2 obtained in a case where light has entered camera 101 of Embodiment 1 of the present disclosure at incident angle α. Note that, a curve indicated by a one-dot chain line in FIG. 7 has the same circular shape as image height curve C1 in a case where there is no manufacturing error, and has a center shifted from point O1 to point O2. Hereinafter, this curve is referred to as "image height curve C1'". Points a11', a12', and a13' are points on image height curve C1' and correspond to points a11, a12, and a13 on image height curve C1, respectively. The angles illustrated in FIG. 7 indicate azimuth angles around point O2, and the azimuth angle at which point a21 on sensor 12 is located is defined as 0°. Note that, in a case where light with incident angle α to be guided to point a13 on sensor 12, which corresponds to the case where lens L4 is free of manufacturing error, has entered camera 101 having a manufacturing error as illustrated in FIG. 6, the light is guided to the position indicated by point a23 on sensor 12 by lens unit 11.

At the azimuth angle of 0°, point a21 deviates from point a11' by Δa1. At the azimuth angle of 180°, point a22 deviates from point a12' by Δa2. At the azimuth angle of 315°, point a23 deviates from point a13' by Δa3. These deviation amounts Δa1, Δa2, and Δa3 have values different from each other. That is, the deviation amount varies depending on the azimuth angle. Accordingly, as indicated by a solid line in FIG. 7, image height curve C2 has a non-circular shape. Further, the image height curve to be obtained also varies depending on incident angle α at which light enters lens unit 11.

Figure 8:
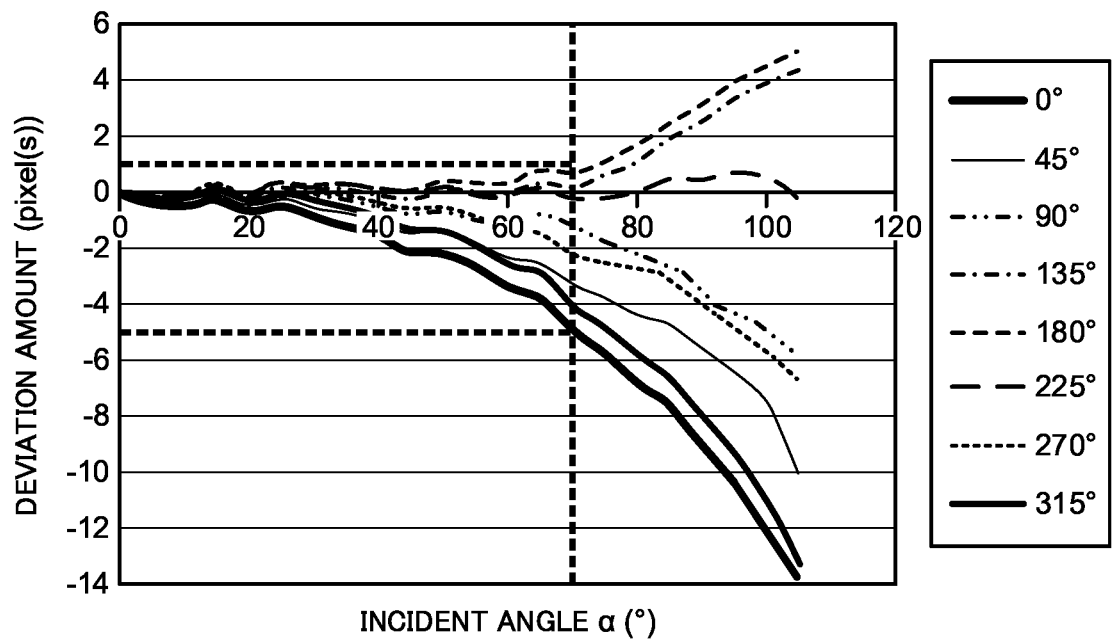
FIG. 8 illustrates deviation amounts between image heights obtained by light having entered the camera assumed to be free of manufacturing error and image heights obtained by light having entered the camera having a manufacturing error.

FIG. 8 illustrates deviation amounts between image heights obtained by light having entered camera 101 assumed to be free of manufacturing error and image heights obtained by light having entered camera 101 having a manufacturing error. FIG. 8 indicates relationships between incident angle α and the deviation amounts at the azimuth angles θ=0°, 45°, 90°, 135°, 180°, 225°, 270°, and 315°. Note that, in FIG. 8, the unit of the incident angle of the horizontal axis is ° (degrees) and the unit of the deviation amount of the vertical axis is pixel(s).

In FIG. 8, the deviation amount of the incident angle of 70° in a direction of the azimuth angle of 0° is approximately −5 pixels, and the deviation amount of the incident angle of 70° in a direction of the azimuth angle of 180° is approximately +1 pixel. The entire tendency is that as incident angle α becomes larger, the deviation amount becomes larger at whatever azimuth angle.

Characteristics of an image obtained in a case where camera 101 has a manufacturing error have been described thus far. The same also apples to cameras 102, 103, and 104.

Figure 9:
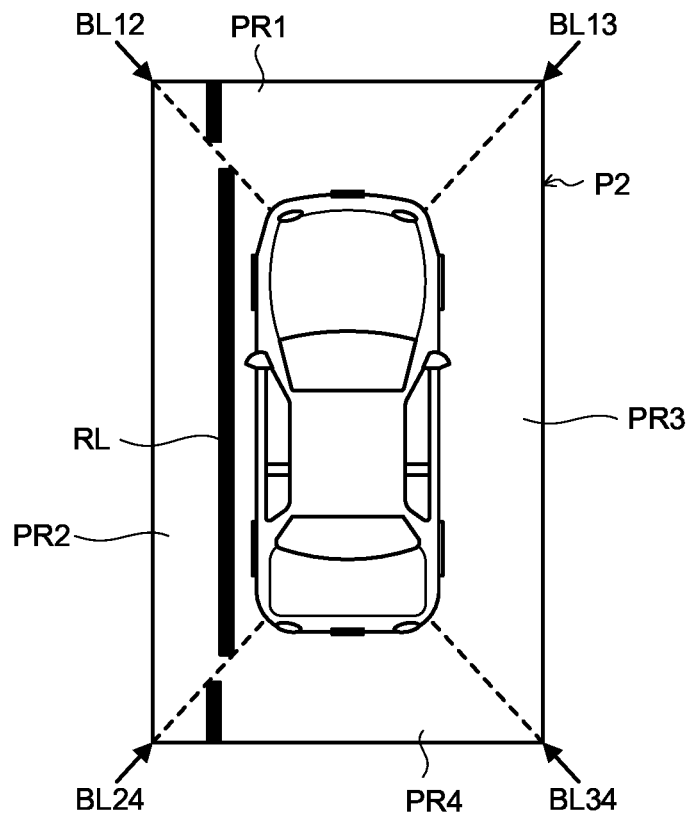
FIG. 9 illustrates a bird's-eye view that is an example of a non-ideal bird's-eye view.

In a case where any of cameras 101, 102, 103, and 104 has a manufacturing error as described above, bird's-eye view (actual combined image) P2 as exemplified in FIG. 9 is generated when distortion of images obtained from cameras 101, 102, 103, and 104 is eliminated by a general method and the images from which the distortion has been eliminated are combined.

FIG. 9 illustrates bird's-eye view (actual combined image) P2 that is an example of a non-ideal bird's-eye view. On bird's-eye view P2, roadside strip RL located across image regions PR1, PR2, and PR4 deviates near boundary lines BL12 and BL24, and is indicated as if roadside strip RL has three lines. In a case where a pedestrian is indicated across a plurality of regions, the pedestrian is displayed in a segmented manner on a generated bird's-eye view. In this case, a driver of vehicle 100 is unable to recognize the pedestrian indicated on the bird's-eye view correctly, which prevents the driver from driving vehicle 100 safely. Further, in a case where an autonomous driving system is mounted on vehicle 100, the autonomous driving system is incapable of recognizing the pedestrian displayed in a segmented manner on a bird's-eye view as a pedestrian, and is incapable of performing control of vehicle 100 for the safety of the pedestrian.

The present disclosure makes it possible to generate bird's-eye view P1 that is ideal even in a case where cameras 101, 102, 103, and/or 104 have/has a manufacturing error. Hereinafter, Embodiment 1 of the present disclosure will be described.

Figure 10:
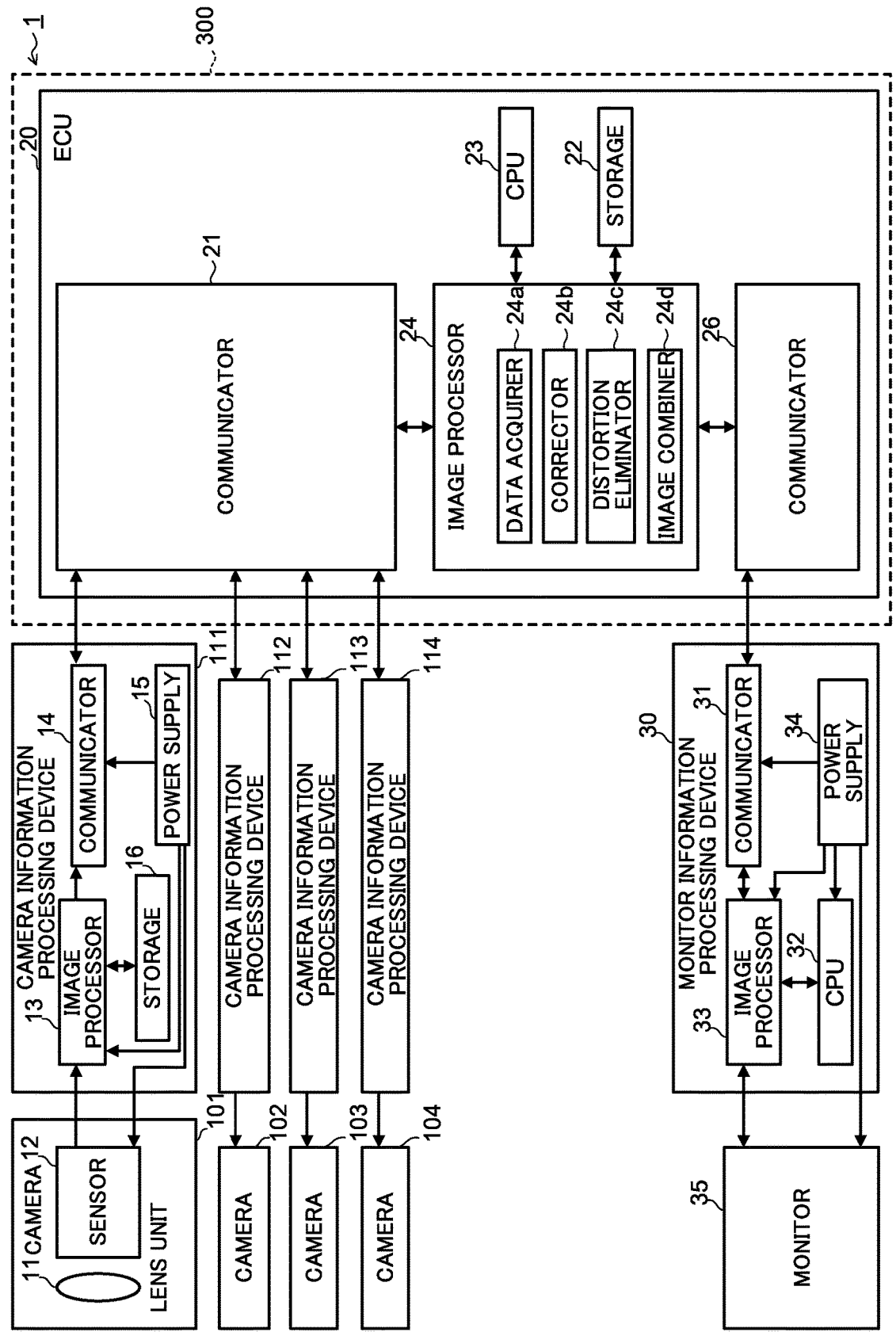
FIG. 10 is a block diagram illustrating a configuration of the camera system according to Embodiment 1 of the present disclosure.

FIG. 10 is a block diagram illustrating a configuration of camera system 1 according to Embodiment 1 of the present disclosure. Camera system 1 includes cameras 101, 102, 103, and 104, camera information processing devices 111, 112, 113, and 114, ECU 20, monitor information processing device 30, and monitor 35. In the present embodiment, ECU 20 is an image correction apparatus that corrects distortion of images obtained from each camera. Further, ECU 20 is image generation apparatus 300 that corrects distortion of images, eliminates the distortion from the images in which the distortion has been corrected, and further combines the images from which the distortion has been eliminated.

Camera 101 includes lens unit 11 and sensor 12. Lens unit 11 causes an image in an imaging region of camera 101 to be formed on sensor 12. Sensor 12 converts an imaged light into an electrical signal. Thus, sensor 12 generates an image signal including image data in imaging range R1 (see FIG. 1) of camera 101. The image data also includes image height information. A plurality of pixels may be arranged in a Bayer arrangement in sensor 12, and the image data described above also includes color information obtained by these pixels. Further, sensor 12 transmits a generated image signal to camera information processing device 111. Note that, cameras 102, 103, and 104 also have the same configuration.

Camera information processing devices 111, 112, 113, and 114 process image signals generated by cameras 101, 102, 103, and 104, respectively. Camera information processing devices 111, 112, 113, and 114 are devices dedicated to cameras 101, 102, 103, and 104, respectively.

Camera information processing device 111 includes image processor 13, communicator 14, power supply 15, storage 16, and the like.

Image processor 13 performs predetermined image processing on an image signal acquired from sensor 12. Specifically, image processor 13 performs e.g. contrast adjustment and gain adjustment on an image signal from sensor 12. Camera information processing device 111 then transmits an image signal subjected to the image processing to communicator 14.

Communicator 14 performs signal conversion processing on an image signal received from image processor 13 to generate an image signal for communication. Communicator 14 then transmits a generated image signal for communication to ECU 20. Power supply 15 supplies power to image processor 13, communicator 14, and sensor 12 of camera 101.

Storage 16 includes a ROM in which a control program for controlling camera information processing device 111 is stored, and a RAM. Further, storage 16 stores data necessary for image processing performed by image processor 13. When image processor 13 performs image processing, image processor 13 refers to the data necessary for image processing stored in storage 16.

Further, storage 16 preliminarily stores data for performing correction processing of image data from camera 101. The data for performing correction processing is also stored in ECU 20. Specifically, storage 16 stores difference table 201 illustrated in FIG. 11. Difference table 201 will be described in detail later.

Camera information processing device 111 includes a central processing unit (CPU) that is not illustrated in FIG. 10. The CPU reads out the control program stored in the ROM, loads the control program into the RAM, and executes the loaded control program so that the CPU functions as image processor 13.

Note that, camera information processing devices 112, 113, and 114 have the same configuration as camera information processing device 111.

In general, an imager (corresponding to cameras 101 to 104) having an imaging function and an information (signal) processor (corresponding to camera information processing devices 111 to 114) that processes an image obtained by the imager may be referred to as "camera" integrally. In the present specification, however, a device corresponding to the imager is referred to as "camera".

Note that, the imager and the information (signal) processor may be formed separately from each other as different devices. Alternatively, the imager and the information (signal) processor may be integrally formed as one device.

ECU 20 includes communicator 21, storage 22, CPU 23, image processor 24, and communicator 26.

When communicator 21 receives an image signal for communication from camera information processing devices 111, 112, 113, and 114, communicator 21 performs signal conversion processing on the image signal. This processing causes the image signal to be converted into an image signal for image processing. Communicator 21 then transmits an image signal for image processing to image processor 24.

Storage 22 includes a read only memory (ROM), and a random access memory (RAM). Further, storage 22 stores data for performing correction processing on image data from camera information processing devices 111 to 114 in association with each camera.

FIG. 11 illustrates difference tables 201, 202, 203, and 204 stored in storages 16 and 22 included in camera system 1 according to Embodiment 1 of the present disclosure. The difference tables are associated with each camera. That is, difference table 201 includes difference data for processing image data acquired from camera 101 and camera information processing device 111. In the same manner, difference tables 202, 203, and 204 include difference data for processing image data acquired by cameras 102, 103, and 104, respectively. Since manufacturing errors may vary depending on the cameras, difference tables including difference data in view of manufacturing errors for each camera are prepared.

Difference table 201 manages difference data in association with incident angle α and azimuth angle θ. Difference table 201 includes difference data of each azimuth angle θ from 0° to 315° in increments of 45° at each incident angle α from 0° to 100° in increments of 10°. 100° corresponds to ½ of the angle of view of camera 101. Hereinafter, the difference data managed by difference table 201 will be described with reference to FIGS. 8 and 11.

The difference data managed by difference table 201 is each value obtained by subtracting an image height (reference image height) (2) obtained by light having entered camera 101 at a certain incident angle in a case where camera 101 is free of manufacturing error from an image height (1) obtained by light having entered camera 101 at the certain incident angle. That is, the difference data is each value indicated by (1)–(2). Note that, the unit of this value is pixel(s).

For example, when it is focused on light having entered camera 101 at the incident angle of 70°, the difference data at the azimuth angles of 0°, 45°, 90°, 135°, 180°, 225°, 270°, and 315° is "−5", "−3.5", "−1", "0", "+1", "−0.5", and "−4", respectively. Note that, these values correspond to the deviation amounts illustrated in FIG. 8.

Note that, the difference data may be each difference between an image height (1) obtained by light having entered camera 101 at a certain incident angle and a reference image height (2) obtained by light having entered camera 101 at the certain incident angle in a case where camera 101 is free of manufacturing error. That is, the difference data may be each value indicated by (2)–(1).

The difference data managed by difference table 201 is obtained as follows. Each image height corresponding to each incident angle and each azimuth angle is measured by examining camera 101 before camera 101 is mounted on vehicle 100. Then, each difference data is obtained by subtracting each image height (reference image height) corresponding to each incident angle and each azimuth angle in a case where camera 101 is free of manufacturing error from each image height corresponding to each incident angle and each azimuth angle obtained by the measurement.

Note that, the difference data may also be obtained by guessing a factor in a manufacturing error of camera 101, estimating each image height corresponding to each incident angle and each azimuth angle by simulation, and subtracting each image height corresponding to each incident angle and each azimuth angle in a case where camera 101 is free of manufacturing error from the estimated each image height, respectively.

Further, difference table 201 includes difference data at each incident angle in increments of 10°, but may not necessarily include difference data at each incident angle in increments of 10°. Further, difference table 201 includes difference data at each azimuth angle in increments of 45°, but may not necessarily include difference data at each azimuth angle in increments of 45°.

Although difference table 201 has been described thus far, the same also applies to difference tables 202, 203, and 204.

Here, difference tables 201 to 204 stored in storage 22 are preliminarily stored in camera information processing devices 111 to 114. After camera system 1 is introduced into vehicle 100, ECU 20 reads out difference tables 201 to 204 from the storages of camera information processing devices 111 to 114 and stores difference tables 201 to 204 in storage 22.

As described above, camera information processing devices 111 to 114 preliminarily store difference tables 201 to 204 of cameras 101 to 104 corresponding thereto so that even when a camera of camera system 1 is replaced, ECU 20 is capable of appropriately correcting image data from the newly attached camera.

Note that, data stored in storage 22 may not be difference data. Hereinafter, an example thereof will be described.

When each difference data (discrete value) in FIG. 11 is connected to each other, the graph illustrated in FIG. 8 is drawn. An optimum polynomial function for connecting each difference data (discrete value) to each other may be determined and each coefficient of the determined polynomial function may be stored in storage 22. Here, a polynomial function is determined for each camera and for each incident angle. Accordingly, storage 22 stores a plurality of coefficients of polynomial functions in association with the cameras and the incident angles.

Further, storage 22 may also store these coefficients of functions in addition to difference tables 201 to 204.

Storage 16 of camera information processing device 111 may also store, instead of difference table 201, each coefficient of each optimum polynomial function for each incident angle, where each optimum polynomial function is determined from difference data corresponding to camera 101, in association with each incident angle. Alternatively, storage 16 may also store these coefficients together with difference data. The same also applies to camera information processing devices 112 to 114.

CPU 23 reads out a control program stored in the ROM stored in storage 22, loads the control program into the RAM, and executes the loaded control program so that CPU 23 functions as a controller that controls the entire operation of ECU 20.

Image processor 24 controls an operation related to image processing in the control performed by CPU 23. Specifically, image processor 24 functions as data acquirer 24a, corrector 24b, distortion eliminator 24c, and image combiner 24d.

Data acquirer 24a acquires image data obtained by cameras 101, 102, 103, and 104. In the present embodiment, data acquirer 24a acquires image data obtained by each camera by receiving an image signal for image processing from communicator 21.

Corrector 24b corrects image data acquired by data acquirer 24a based on difference data stored in storage 22.

For example, in a case where corrector 24b corrects image data from camera 101, corrector 24b refers to difference table 201. Corrector 24b then calculates the magnitude of distortion correction for each incident angle and each azimuth angle based on difference data. At this time, corrector 24b perform the calculation by also considering whether correction is performed so as to increase an image height or so as to reduce an image height. Corrector 24b then corrects distortion of an image obtained from camera 101 based on a calculation result.

A set of incident angle α and azimuth angle θ corresponds to each position on an image. For example, the larger incident angle α is, the farther a position corresponding to a set of incident angle α and azimuth angle θ is from a position corresponding to point O2 on an image. Further, the azimuth angles indicate directions around point O2 as described above.

In a case where difference data is denoted with "−", corrector 24b performs enlargement correction (distortion correction so as to extend an image height). In a case where difference data is denoted with "+", on the other hand, corrector 24b performs reduction correction (distortion correction to reduce an image height).

In difference table 201 illustrated in FIG. 11, the difference data at the incident angle of 70° and at the azimuth angle of 0° is "−5", the difference data at the incident angle of 70° and at the azimuth angle 45° is "−3.5", and the difference data at the incident angle of 70° and at the azimuth angle of 90° is "−1". Further, in difference table 201, the difference data at the incident angle of 70° and at the azimuth angle of 90° is "+1".

Accordingly, corrector 24b performs +5-pixel enlargement correction for a vicinity of a position corresponding to the incident angle of 70° and the azimuth angle of 0° on an image from camera 101 due to a −5 pixel reduction characteristic. In the same manner, corrector 24b performs +3.5-pixel enlargement correction for a vicinity of a position corresponding to the incident angle of 70° and the azimuth angle of 45° on an image from camera 101. In the same manner, corrector 24b also performs +1-pixel enlargement correction for a vicinity of a position corresponding to the incident angle of 70° and the azimuth angle of 90° on an image from camera 101. Corrector 24b also performs—1-pixel enlargement correction for a position corresponding to the incident angle of 70° and the azimuth angle of 180° on an image from camera 101.

Corrector 24b also performs distortion correction for vicinities of positions corresponding to the incident angle of 70° and each of other azimuth angles on images in the same manner.

Further, corrector 24b also performs distortion correction for vicinities of positions corresponding to the other incident angles in the same manner.

The correction processing described above causes an image acquired by camera 101 to approach an image obtained in a case where camera 101 is free of manufacturing error. That is, the correction processing described above causes distortion of an image acquired by camera 101 to become the same as distortion of an image acquired in a case where camera 101 is free of manufacturing error.

Image data acquired by cameras 102, 103, and 104 is also corrected in the same manner. Hereinafter, images generated as a result of corrector 24b correcting images acquired by cameras 101, 102, 103, and 104 are referred to as "corrected images HP1, HP2, HP3, and HP4".

Distortion eliminator 24c eliminates distortion from a corrected image generated by corrector 24b. Specifically speaking, distortion eliminator 24c performs distortion elimination processing for correcting an image (an image having distortion) obtained in a case where each camera is assumed to be free of manufacturing error to an image free of distortion. Specifically, distortion eliminator 24c eliminates distortion from corrected images HP1, HP2, HP3, and HP4 to generate distortion-eliminated images PP1, PP2, PP3, and PP4. The distortion elimination processing is performed by a generally known method.

Image combiner 24d combines distortion-eliminated images PP1, PP2, PP3, and PP4 to generate a combined image. Image combiner 24d transmits a generated combined image to communicator 26.

Note that, each time when corrector 24b, distortion eliminator 24c, and image combiner 24d perform processing, processed image data is stored in storage 22. That is, corrected images HP1, HP2, HP3, and HP4, distortion-eliminated images PP1, PP2, PP3, and PP4, and a combined image are stored in storage 22.

Communicator 26 performs signal conversion processing of an image signal received from image combiner 24d to generate an image signal for communication. Communicator 26 then transmits a generated image signal for communication to monitor information processing device 30.

Monitor information processing device 30 includes communicator 31, CPU 32, image processor 33, and power supply 34.

Communicator 31 performs signal conversion processing on an image signal received from ECU 20. This processing causes the image signal to be converted into an image signal for image processing. Communicator 31 then transmits an image signal for image processing to image processor 33.

A memory (not illustrated) in monitor information processing device 30 includes a RAM and a ROM. CPU 32 reads out a control program stored in the ROM, loads the control program into the RAM, and executes the loaded control program so that CPU 32 functions as a controller that controls the entire operation of monitor information processing device 30.

Image processor 33 controls an operation related to image processing in the control performed by CPU 32. Image processor 33 performs signal conversion processing for converting an image signal received from communicator 31 into a signal for display on monitor 35. Image processor 33 then transmits an image signal subjected to the signal conversion processing to monitor 35.

Power supply 34 supplies power to communicator 31, CPU 32, image processor 33, and monitor 35.

Monitor 35 receives an image signal from image processor 33, and displays a combined image based on the image signal. At this time, monitor 35 displays bird's-eye view (ideal combined image) P1 as illustrated in FIG. 5.

As described above, according to the present embodiment, correcting image data obtained from cameras 101, 102, 103, and 104 based on difference data makes it possible to obtain an image comparable to an image obtained in a case where cameras 101, 102, 103, and/or 104 are/is free of manufacturing error.

Preliminarily storing difference data for each azimuth angle makes it possible to perform appropriate distortion correction for each azimuth angle around an image center. Further, preliminarily storing difference data for each incident angle makes it possible to perform appropriate distortion correction in accordance with a distance from a vicinity of an image center.

Further, an ideal bird's-eye view can be obtained by performing the above-described distortion correction and the above-described distortion elimination processing on images obtained from cameras 101, 102, 103, and 104 and generating a combined image based on the images on which the distortion correction and distortion elimination processing have been performed.

Note that, not necessarily one difference table, but a plurality of difference tables may be associated with each camera. Hereinafter, an example in which a plurality of difference tables is associated with each camera will be described.

Figure 12:
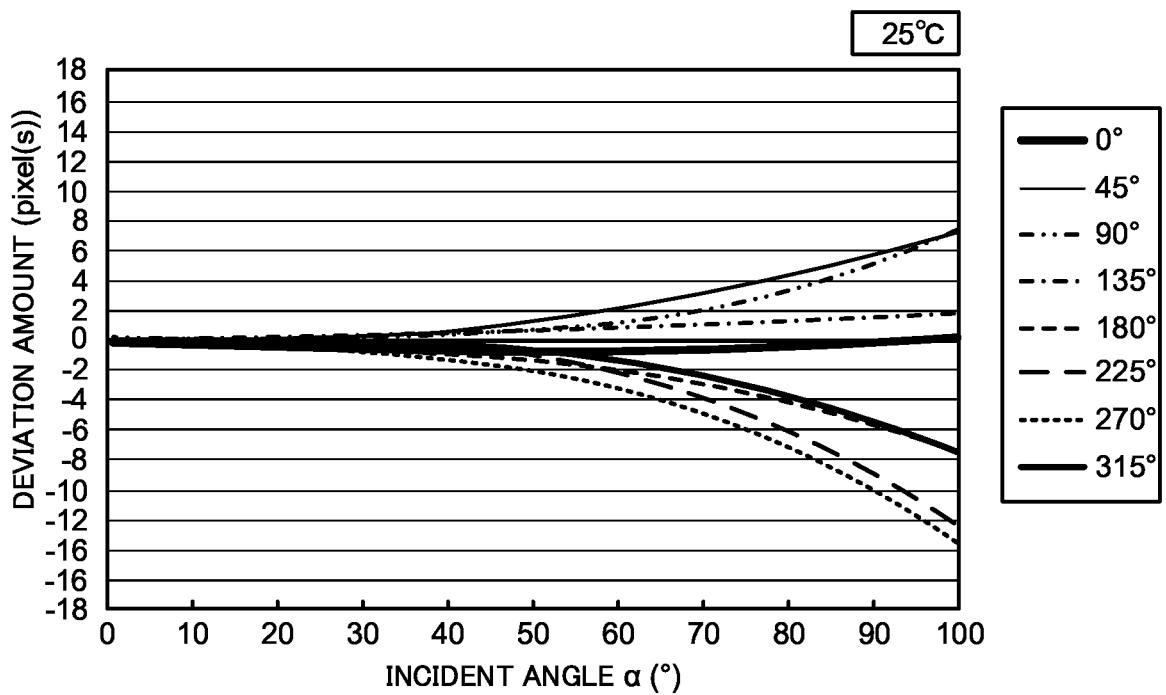
FIG. 12 illustrates deviation amounts between image heights obtained by light having entered a camera having a manufacturing error and image heights obtained by light having entered the camera assumed to be free of manufacturing error in a case where the camera having a manufacturing error has a temperature of 25° C.
Figure 13:
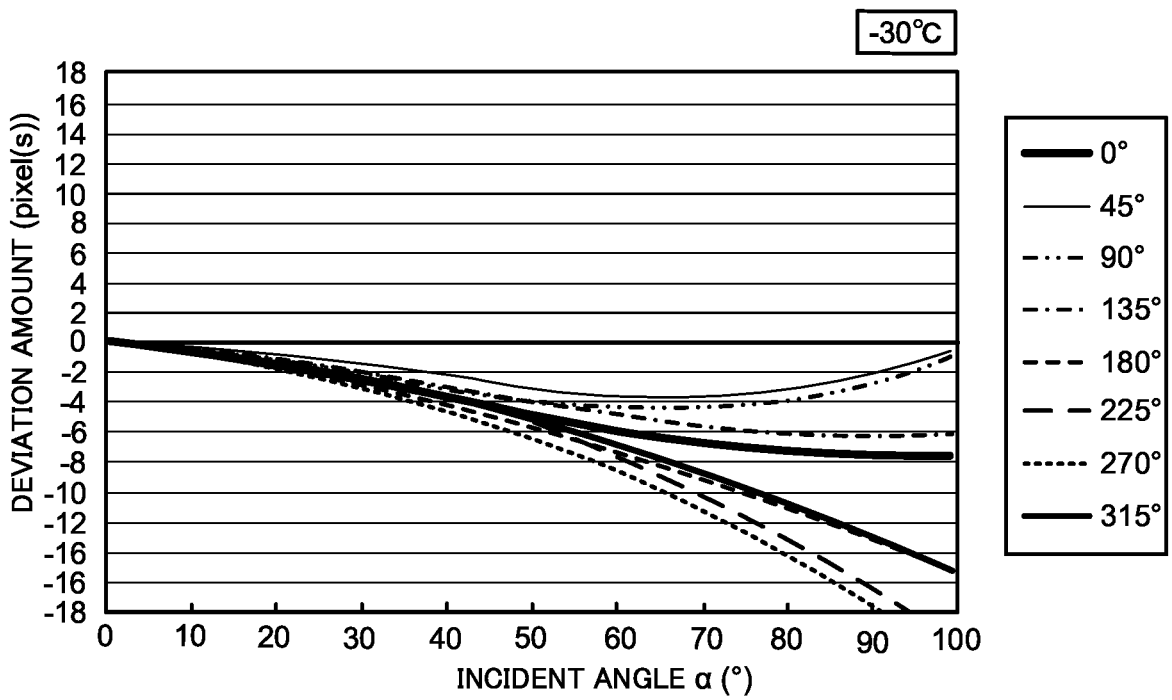
FIG. 13 illustrates deviation amounts between image heights obtained by light having entered a camera having a manufacturing error and image heights obtained by light having entered the camera assumed to be free of manufacturing error in a case where the camera having a manufacturing error has a temperature of −30° C.

The deviation amounts illustrated in FIG. 8 may vary depending on the temperature of a camera (lens unit 11). FIG. 12 illustrates deviation amounts between image heights obtained by light having entered a camera having a manufacturing error and image heights obtained by light having entered the camera assumed to be free of manufacturing error in a case where the camera having a manufacturing error has a temperature of 25° C. FIG. 13 illustrates deviation amounts between image heights obtained by light having entered a camera having a manufacturing error and image heights obtained by light having entered the camera assumed to be free of manufacturing error in a case where the camera having a manufacturing error has a temperature of −30° C. As illustrated in FIGS. 12 and 13, when a camera (lens unit 11) has different temperatures, graphs illustrating relationships between the incident angle and the deviation amount are different at whatever azimuth angle. That is, when the temperature of a camera (lens unit 11) changes, a deviation amount corresponding to a predetermined incident angle and a predetermined azimuth angle also changes.

As illustrated in FIGS. 12 and 13, the deviation amount may vary depending on the temperature of a camera (lens unit 11) so that appropriate distortion correction cannot be performed in a case where corrector 24b uses the same difference data between when the air temperature is high and when the air temperature is low.

Accordingly, storage 22 may store a difference table corresponding to a temperature range T<T1, a difference table corresponding to a temperature range T1≤T<T2, and a difference table corresponding to a temperature range T2≤T in association with each camera. Here, the difference table corresponding to the temperature range T<T1 is a table including difference data when temperature T of lens unit 11 is in the temperature range T<T1. The difference table corresponding to the temperature T1≤T<T2 is a table including difference data when temperature T of lens unit 11 is in the temperature range T1≤T<T2. The difference table corresponding to the temperature T2≤T is a table including difference data when temperature T of lens unit 11 is in the temperature range T2≤T.

In this case, each camera desirably includes a temperature sensor. Then, corrector 24b selects an appropriate difference table based on a temperature detected by a temperature sensor of a camera, and corrects image data obtained from the camera based on difference data of the selected difference table.

Storage 22 may not store each difference table corresponding to each temperature range, but may store each difference table corresponding to each of a plurality of temperatures.

That is, storage 22 may, for example, store difference tables for 25° C., 10° C., 0° C., −10° C., −20° C., and −30° C. corresponding to 25° C., 10° C., 0° C., −10° C., 20° C., and −30° C. in association with each camera.

In this case, corrector 24b selects an appropriate difference table based on a temperature detected by a temperature sensor of a camera. At this time, corrector 24b selects a difference table corresponding to a temperature closest to a detected temperature. Alternatively, in a case where a difference table corresponding to a detected temperature is not stored in storage 22, corrector 24b may calculate difference data to be used in distortion correction based on difference data of a difference table stored in storage 22.

For example, in a case where a detected temperature is −15° C., corrector 24b calculates, based on difference data of a difference table for −10° C. and difference data of a difference table for −20° C., each difference data corresponding to each incident angle and each azimuth angle in a case where lens unit 11 has −15° C. Corrector 24b then corrects image data using the calculated data.

The method of calculating difference data is not particularly limited. For example, corrector 24b may calculate difference data in a case where lens unit 11 has −15° C. by performing a proportional calculation based on difference data of a difference table for −10° C. and difference data of a difference table for −20° C.

As described above, storage 22 stores difference tables for each temperature range or for each temperature so that it is possible to perform distortion correction in which the temperature of lens unit 11 is also taken into consideration. Accordingly, it is possible to correct image data obtained from a camera more accurately.

Further, optical axis L of lens unit 11 may deviate from point O1 due to a manufacturing error in camera 101, although there is no eccentricity in lenses L1 to L6. In this case, an image height curve obtained by light entering lens unit 11 has a circular shape, although the center of the image height curve deviates in comparison with a case where camera 101 is free of manufacturing error. Even in such a case, the image correction apparatus and image generation apparatus 300 according to the present embodiment make it possible to obtain an image comparable to an image obtained in a case where camera 101 is free of manufacturing error, and make it possible to obtain an ideal bird's-eye view.

In Embodiment 1, distortion correction of an image is performed by ECU 20 so that storage 16 of camera information processing device 111 may not store data for distortion correction processing.

Embodiment 2

Hereinafter, Embodiment 2 of the present disclosure will be described with reference to FIG. 14. In the embodiment described below, portions exhibiting the same function and effect as those of Embodiment 1 described above will be denoted with the same reference signs and descriptions of the portions will be omitted. In the following description, points different from those in Embodiment 1 will be mainly described.

In Embodiment 1, distortion correction of images obtained by cameras 101, 102, 103, and 104, distortion elimination of images subjected to the distortion correction, and a combination of images subjected to the distortion elimination are performed within ECU 20. In Embodiment 2, distortion correction of images obtained by cameras 101, 102, 103, and 104 is performed within camera information processing devices provided corresponding to each camera. In the present embodiment, camera information processing devices 111, 112, 113, and 114 are image correction apparatuses that correct distortion of images from cameras 101, 102, 103, and 104 corresponding thereto. Further, ECU 20, and camera information processing devices 111, 112, 113, and 114 form image generation apparatus 300 that corrects distortion of images, eliminates the distortion of the images, and combines the images from which the distortion has been eliminated.

Figure 14:
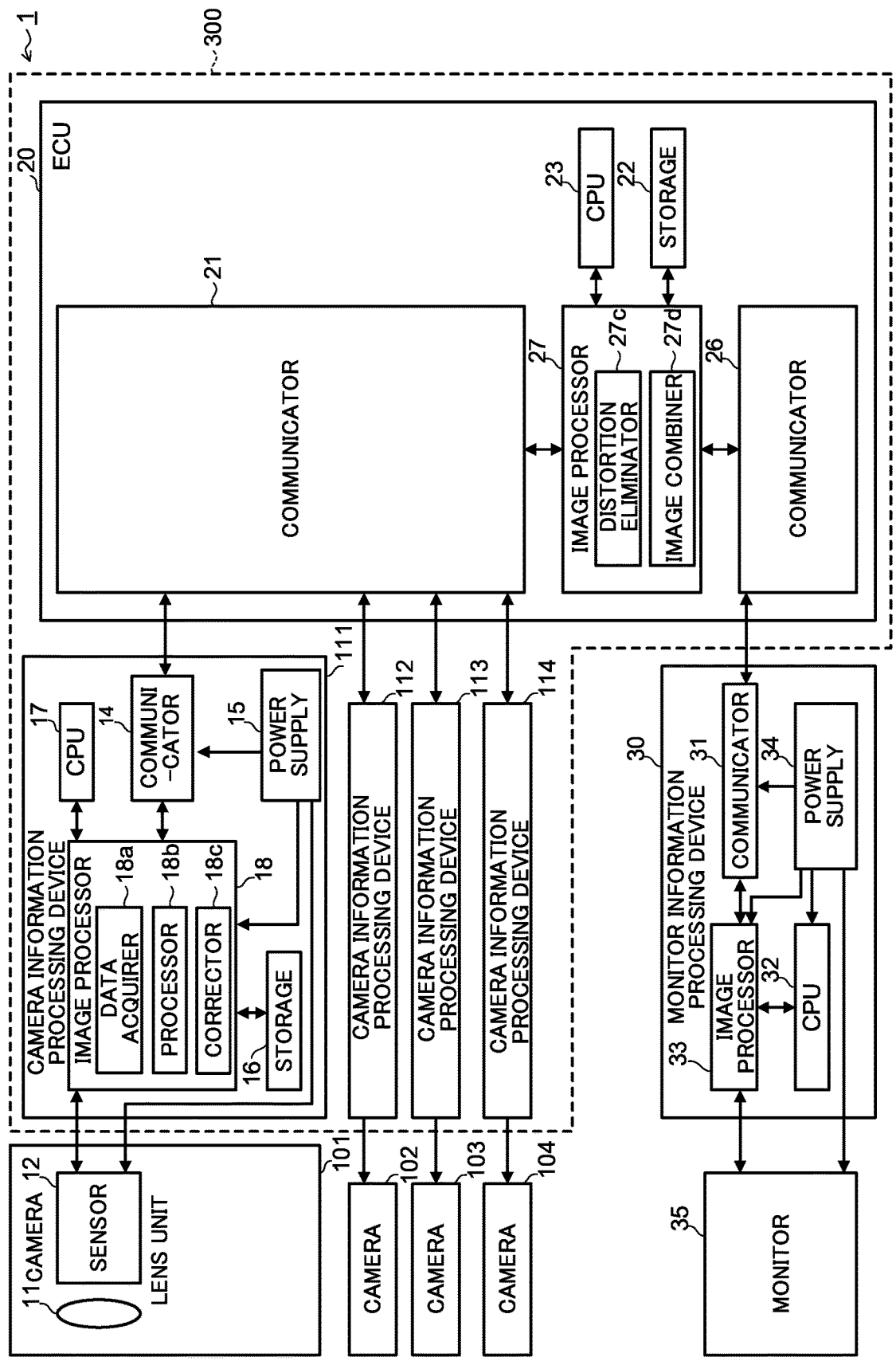
FIG. 14 is a block diagram illustrating a configuration of a camera system according to Embodiment 2 of the present disclosure.

FIG. 14 is a block diagram illustrating a configuration of camera system 1 according to Embodiment 2 of the present disclosure. Camera information processing device 111 newly includes CPU 17, and includes image processor 18 instead of image processor 13.

CPU 17 reads out the control program stored in the ROM included in storage 16, loads the control program into the RAM, and executes the loaded control program so that CPU 17 functions as a controller that controls the entire operation of camera information processing device 111.

Image processor 18 controls an operation related to image processing in the control performed by CPU 17. Specifically, image processor 18 functions as data acquirer 18a, processor 18b, and corrector 18c.

Data acquirer 18a acquires image data obtained by camera 101. Specifically, data acquirer 18a acquires an image signal from sensor 12.

Processor 18b performs e.g. contrast adjustment and gain adjustment on an image signal acquired by data acquirer 18a.

Corrector 18c corrects image data included in a signal processed by processor 18b based on difference data of difference table 201 stored in storage 16. Corrector 18c generates corrected image HP1 by correcting distortion in the same manner as corrector 24*b*. Corrected image HP1 that has been generated is stored in storage 16.

Communicator 14 performs signal conversion processing on a signal of image data corrected by corrector 18*c* to generate an image signal for communication. Communicator 14 then transmits a generated image signal to ECU 20.

Although camera information processing device 111 has been described, camera information processing devices 112, 113, and 114 also have the same configuration and function as camera information processing device 111. That is, image data acquired by cameras 102, 103, and 104 is subjected to distortion correction within camera information processing devices 112, 113, and 114. As a result of distortion correction of image data thereof, corrected images HP2, HP3, and HP4 are generated. Then, signals of corrected images HP2, HP3, and HP4 are transmitted to ECU 20 from camera information processing devices 112, 113, and 114, respectively.

ECU 20 includes image processor 27 instead of image processor 24. That is, image processor 27 functions as distortion eliminator 27*c* and image combiner 27*d*.

Distortion eliminator 27*c* receives image signals, which have been subjected to signal conversion processing by communicator 21, from camera information processing devices 111, 112, 113, and 114. Distortion eliminator 27*c* then eliminates distortion of corrected images HP1, HP2, HP3, and HP4. Details thereof are the same as those of distortion eliminator 24*c* of Embodiment 1.

Image combiner 27*d* has the same function as image combiner 24*d* of Embodiment 1.

As described above, even in a configuration in which distortion correction is performed within camera information processing devices 111, 112, 113, and 114 corresponding to each camera and then distortion elimination and an image combination are performed within ECU 20, the same operation and effect as Embodiment 1 are achieved thereby.

In a case where distortion correction is performed within ECU 20, image deterioration may be caused thereby in a process in which an image signal generated by sensor 12 is converted into an image signal for communication, the image signal for communication is received by ECU 20 and is then converted into a signal for image processing again. In Embodiment 2, however, distortion of an image obtained from a camera is corrected before such conversion is performed so that Embodiment 2 is not affected by image deterioration due to the conversion processing. Accordingly, Embodiment 2 makes it possible to perform distortion correction of an image more accurately in comparison with a case where distortion correction of an image is performed within ECU 20.

Note that, as described above, it is also possible to form a camera unit in which camera 101 and camera information processing device 111 are integrated. This camera unit is what is commonly referred to as a "camera". Further, camera 101 and camera information processing device 111 may be separated from each other as separate devices.

<Additional Note>

In addition, each of the embodiments described above is only illustration of an exemplary embodiment for implementing the present disclosure, and the technical scope of the present disclosure shall not be construed limitedly thereby. That is, the present disclosure can be implemented in various forms without departing from the gist or the main features thereof. Namely, while various embodiments have been described herein above, it is to be appreciated that various changes in form and detail may be made without departing from the spirit and scope of the invention(s) presently or hereafter claimed.

This application is a continuation of International Patent Application No. PCT/JP2019/047859, filed on Dec. 6, 2019, the disclosure of which is incorporated herein by reference in its entirety. International Patent Application No. PCT/JP2019/047859 is entitled to (or claims) the benefit of Japanese Patent Application No. 2019-037917, filed on Mar. 1, 2019, the disclosure of which is incorporated herein by reference in its entirety.

INDUSTRIAL APPLICABILITY

The present disclosure is suitable for use in an image correction apparatus that corrects an image from a camera including a lens having a wide angle of view.

REFERENCE SIGNS LIST

1 Camera system
11 Lens unit
11*a* Lens barrel
12 Sensor
13, 18, 24, 27, 33 Image processor
18*a*, 24*a* Data acquirer
18*c*, 24*b* Corrector
14, 21, 26, 31 Communicator
15, 34 Power supply
16, 22 Storage
17, 23, 32 CPU
18*b* Processor
20 ECU
24*c*, 27*c* Distortion eliminator
24*d*, 27*d* Image combiner
30 Monitor information processing device
35 Monitor
100 Vehicle
101, 102, 103, 104 Camera
111, 112, 113, 114 Camera information processing device
201, 202, 203, 204 Difference table
300 Image generation apparatus
A1, A2 Light
BL12, BL13, BL24, BL34 Boundary line
C1 Image height curve (ideal image height curve)
C1' Image height curve
C2 Image height curve (actual image height curve)
P1 Bird's-eye view (ideal combined image)
P2 Bird's-eye view (actual combined image)
a11, a12, a13, a11', a12', a13', a21, a22, a23, b1, b2, LO, O1, O2 Point
Δa1, Δa2, Δa3 Deviation amount
θ Azimuth angle
α Incident angle
RL Roadside strip
L Optical axis
L1, L2, L3, IA, L5, L6 Lens
R1, R2, R3, R4 Imaging range
PR1, PR2, PR3, PR4 Image region

The invention claimed is:

1. An image correction apparatus, comprising:
 an image data acquirer that acquires image data obtained by a camera; and
 a corrector that corrects the image data based on a first difference that is a difference between a first image height obtained by light having entered the camera at a first incident angle and a first reference image height obtained by light having entered the camera at the first incident angle in a case where the camera is free of manufacturing error.

2. The image correction apparatus according to claim 1, wherein
the corrector corrects the image data based on the first difference for each of a plurality of azimuth angles.

3. The image correction apparatus according to claim 1, wherein
the corrector corrects the image data based on a second difference and the first difference, the second difference being a difference between a second image height obtained by light having entered the camera at a second incident angle and a second reference image height obtained by light having entered the camera at the second incident angle in a case where the camera is free of manufacturing error.

4. The image correction apparatus according to claim 1, wherein
the corrector determined a difference to be used in correcting the image data based on a plurality of the first differences and a temperature of the camera, and corrects the image data based on the determined difference, the plurality of first differences being in association with a plurality of temperatures, respectively.

5. An image generation apparatus, comprising:
an image data acquirer that acquires image data obtained by a camera;
a corrector that corrects the image data based on a first difference that is a difference between a first image height obtained by light having entered the camera at a first incident angle and a first reference image height obtained by light having entered the camera at the first incident angle in a case where the camera is free of manufacturing error;
a distortion eliminator that eliminates distortion from a corrected image that is an image generated from the image data corrected by the corrector; and
an image combiner that generates a combined image by combining a first distortion-eliminated image and a second distortion-eliminated image, the first distortion-eliminated image being generated by the distortion eliminator based on first image data obtained by a first camera that is one of a plurality of the cameras, the second distortion-eliminated image being generated by the distortion eliminator based on second image data obtained by a second camera that is another one of the plurality of cameras.

6. The image generation apparatus according to claim 5, wherein
the corrector corrects the image data based on the first difference for each of a plurality of azimuth angles.

7. The image generation apparatus according to claim 5, wherein
the corrector corrects the image data based on a second difference and the first difference, the second difference being a difference between a second image height obtained by light having entered the camera at a second incident angle and a second reference image height obtained by light having entered the camera at the second incident angle in a case where the camera is free of manufacturing error.

8. The image generation apparatus according to claim 5, wherein
the corrector determined a difference to be used in correcting the image data based on a plurality of the first differences and a temperature of the camera, and corrects the image data based on the determined difference, the plurality of first differences being in association with a plurality of temperatures, respectively.

9. A camera system, comprising:
the first camera;
the second camera; and
the image generation apparatus according to claim 5.

10. The camera system according to claim 9, further comprising a monitor that displays the combined image.

11. A vehicle, comprising the camera system according to claim 9.

* * * * *